United States Patent [19]
Singer

[11] Patent Number: 5,877,925
[45] Date of Patent: *Mar. 2, 1999

[54] GROUND FAULT-RATING PLUG FOR MOLDED CASE CIRCUIT BREAKERS

[75] Inventor: Paul H. Singer, West Hartford, Conn.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 767,748

[22] Filed: Dec. 17, 1996

[51] Int. Cl.⁶ .................................................. H02H 3/00
[52] U.S. Cl. ........................... 361/42; 361/102; 361/115; 335/18
[58] Field of Search .................................. 361/42, 47, 49, 361/93–97, 102, 115; 335/6–10, 42, 18, 21

[56] References Cited

U.S. PATENT DOCUMENTS

| | | | |
|---|---|---|---|
| 4,077,055 | 2/1978 | Ellsworth | 361/46 |
| 4,649,455 | 3/1987 | Scott | 361/93 |
| 4,672,501 | 6/1987 | Bilac et al. | 361/96 |
| 4,728,914 | 3/1988 | Morris et al. | 335/6 |
| 4,754,247 | 6/1988 | Raymont et al. | 335/202 |
| 5,027,091 | 6/1991 | Lesslie et al. | 335/132 |
| 5,136,457 | 8/1992 | Durivage, III | 361/93 |
| 5,204,798 | 4/1993 | Scott | 361/93 |
| 5,490,086 | 2/1996 | Alexander | 364/492 |

*Primary Examiner*—Jeffrey Gaffin
*Assistant Examiner*—Michael J. Sherry
*Attorney, Agent, or Firm*—Fishman, Dionne, Cantor & Colburn; Carl B. Horton

[57] ABSTRACT

A ground fault/rating plug for molded case circuit breakers is inserted within the circuit breaker cover for electrical connection with the circuit breaker electronic trip unit. A rating resistor within the ground fault/rating plug enclosure sets the circuit breaker ampere rating. Rotary switches on the outer surface of the ground fault/rating plug enclosure configures the trip unit for ground fault protection.

14 Claims, 3 Drawing Sheets

GROUND FAULT-RATING PLUG FOR MOLDED CASE CIRCUIT BREAKERS

BACKGROUND OF THE INVENTION

U.S. Pat. No. 4,649,455 entitled "Rating Plug for Molded Case Circuit Breaker" describes the use of a removable rating plug enclosure that contains the rating resistor to establish the circuit breaker ampere rating. The rating plug enclosure is arranged to allow direct connection between the rating resistor and the trip unit circuit.

U.S. Pat. No. 4,728,914 entitled "Rating Plug Enclosure for Molded Case Circuit Breakers", U.S. Pat. No. 5,027,091 entitled "Molded Case Circuit Interrupter Rating Plug Keying and Interlock Arrangement", and U.S. Pat. No. 5,204,798 entitled "Metering Accessory for Molded Case Circuit Breakers" each describe rating plugs that interact with the circuit breaker trip unit for various functions.

U.S. Pat. No. 4,077,055 entitled "Ground Fault Protective Device" describes a ground fault circuit interrupter that employs a rating plug to set the ground fault interruption rating.

U.S. Pat. No. 5,136,457 entitled "Processor Controlled Circuit Breaker Trip System Having an Intelligent Rating Plug" describes a rating plug for setting the circuit breaker ampere rating in an electronic trip unit having dedicated ground fault interruption facility.

U.S. Pat. No. 5,490,086 entitled "Plug-ill Ground Fault Monitor for a Circuit Breaker" describes a circuit breaker electronic trip unit that is configured for ground fault interruption by means of a ground fault monitor module that includes switches and a display.

Circuit breakers currently employing rating plug receptacles generally have ground fault facility within the operating firmware. Since some circuit breaker applications do not require ground fault protection, it would be advantageous to the user to select whether the ground fault function should be initiated or not.

One purpose of the invention is to provide a standard circuit breaker rating plug receptacle on the cover of a circuit breaker that allows the operator to select whether ground fault function should be initiated within the circuit breaker trip unit.

SUMMARY OF THE INVENTION

A circuit breaker containing an electronic trip unit configured for overcurrent as well as ground fault protection contains a standard rating plug receptacle for receiving a rating plug containing the rating resistor to set the circuit breaker ampere rating. A ground fault configuring rating plug containing the rating resistor along with a ground fault enabling resistor can be inserted within the rating plug receptacle when ground fault protection is preferred.

DESCRIPTION OF THE PREFERRED EMBODIMENT

Figure 1:
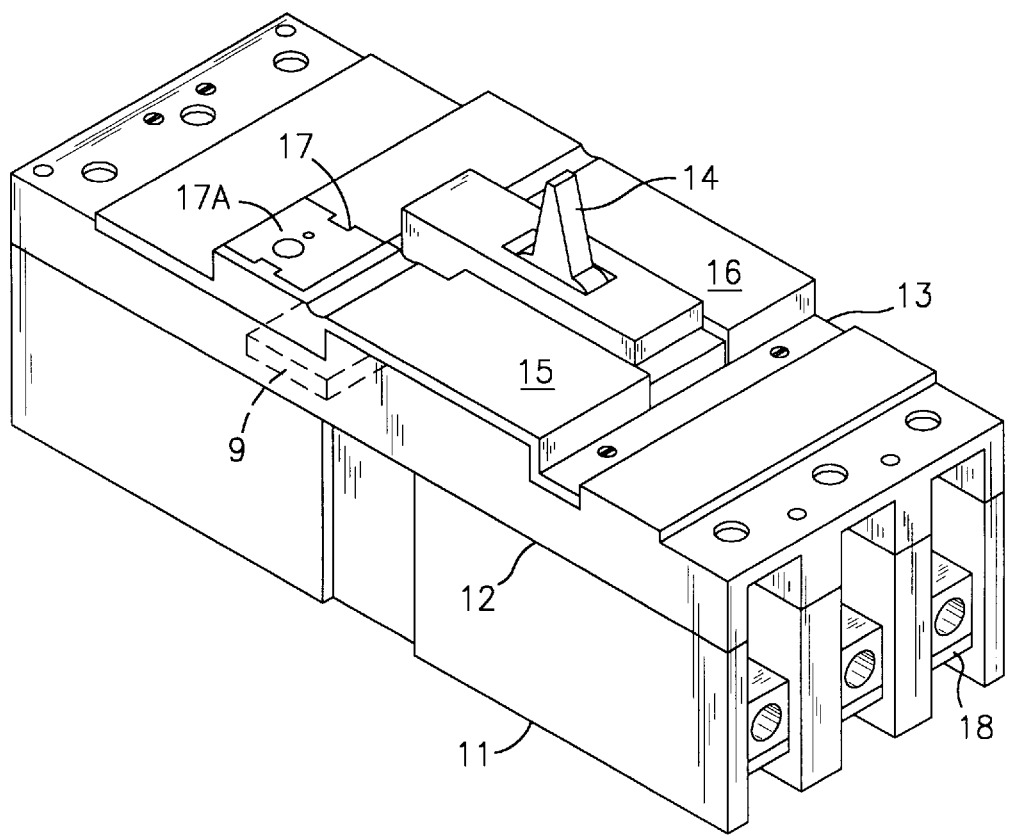
FIG. 1 is a top perspective view of a circuit breaker containing an electronic trip unit and rating plug receptacle according to the prior art.

The circuit breaker 10 shown in FIG. 1 contains an electronic trip unit 9 similar to that described in U.S. Pat. No. 4,672,501 entitled "Circuit Breaker and Protective Relay Unit". The circuit breaker consists of an electrically insulated case 11 to which a cover 12 of similar insulative material is attached. An external handle 14 allows the circuit breaker to be turned ON and OFF independent of the electronic trip unit 9 contained within the cover. Electrical connection with the interior current-carrying components is made by load terminal straps 18 extending from one side of the case and then through the line terminal straps (not shown) extending from the opposite side thereof. A pair of accessory doors 15, 16 allow for the provision of field-installable accessories in the manner described in U.S. Pat. No. 4,754,247 entitled "Molded Case Circuit Breaker Accessory Enclosure". A rating plug 17A extends within the rating plug receptacle 17 within the circuit breaker accessory cover 13 and connects with the circuit breaker trip unit 9 to set the circuit breaker ampere rating.

Figure 2:
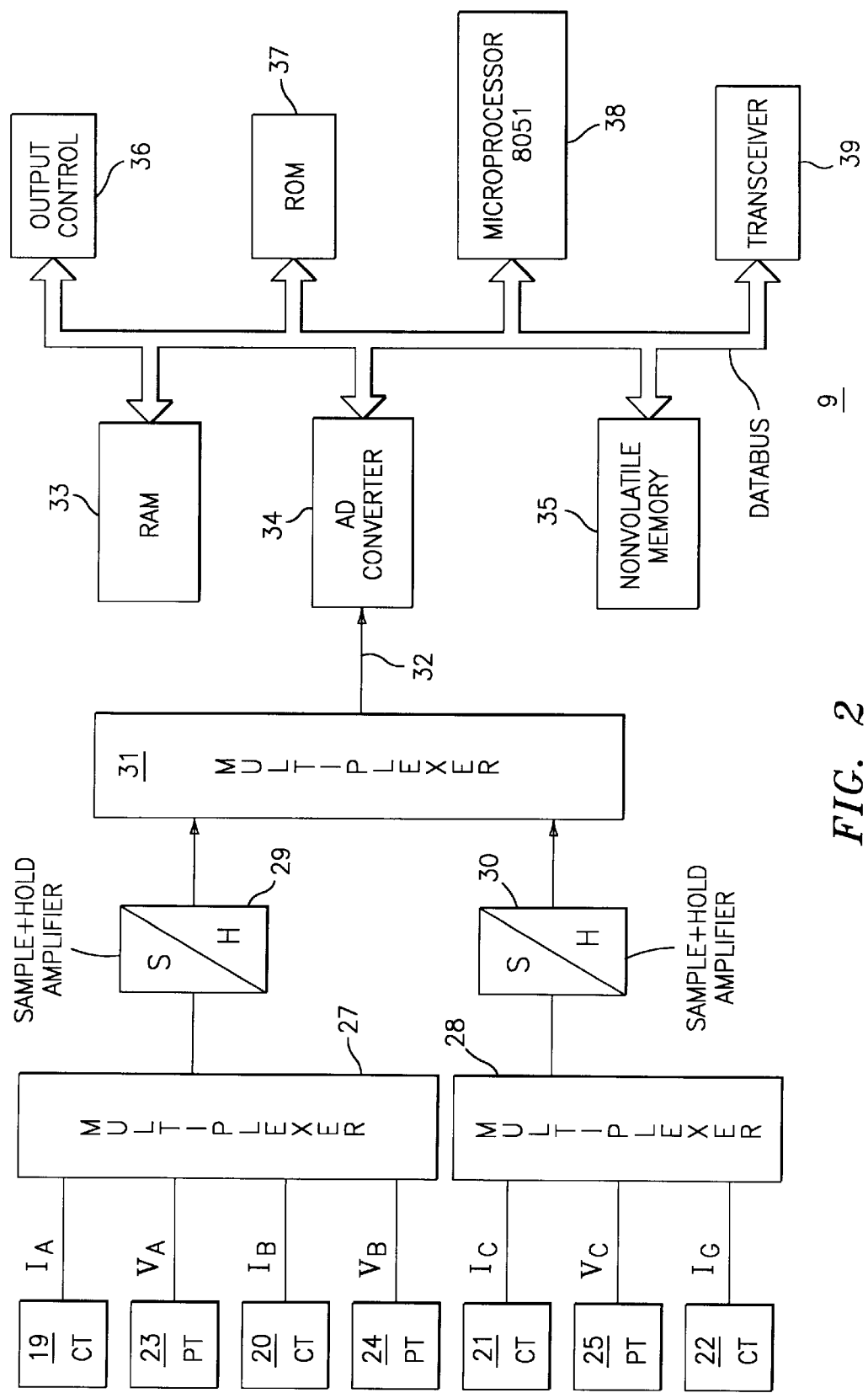
FIG. 2 is a schematic representation of the circuit within the trip unit of FIG. 1.

The trip unit 9 is shown in FIG. 2 connected with current transformers 19–22 and potential transformers 23–25. The electrical input is transmitted through multiplexers 27, 28, 31 and sample and hold amplifiers 29, 30 to an A/D converter 34 by means of conductor 32. Circuit protection and control is achieved by utilization of a data bus which is interconnected with an output control 36, transceiver 39, and ROM 37. The RAM 33, microprocessor 38 and nonvolatile memory 35 operate in the manner described within the aforementioned U.S. Pat. No. 4,672,501 to insure overcurrent circuit protection along with ground fault protection.

Figure 3:
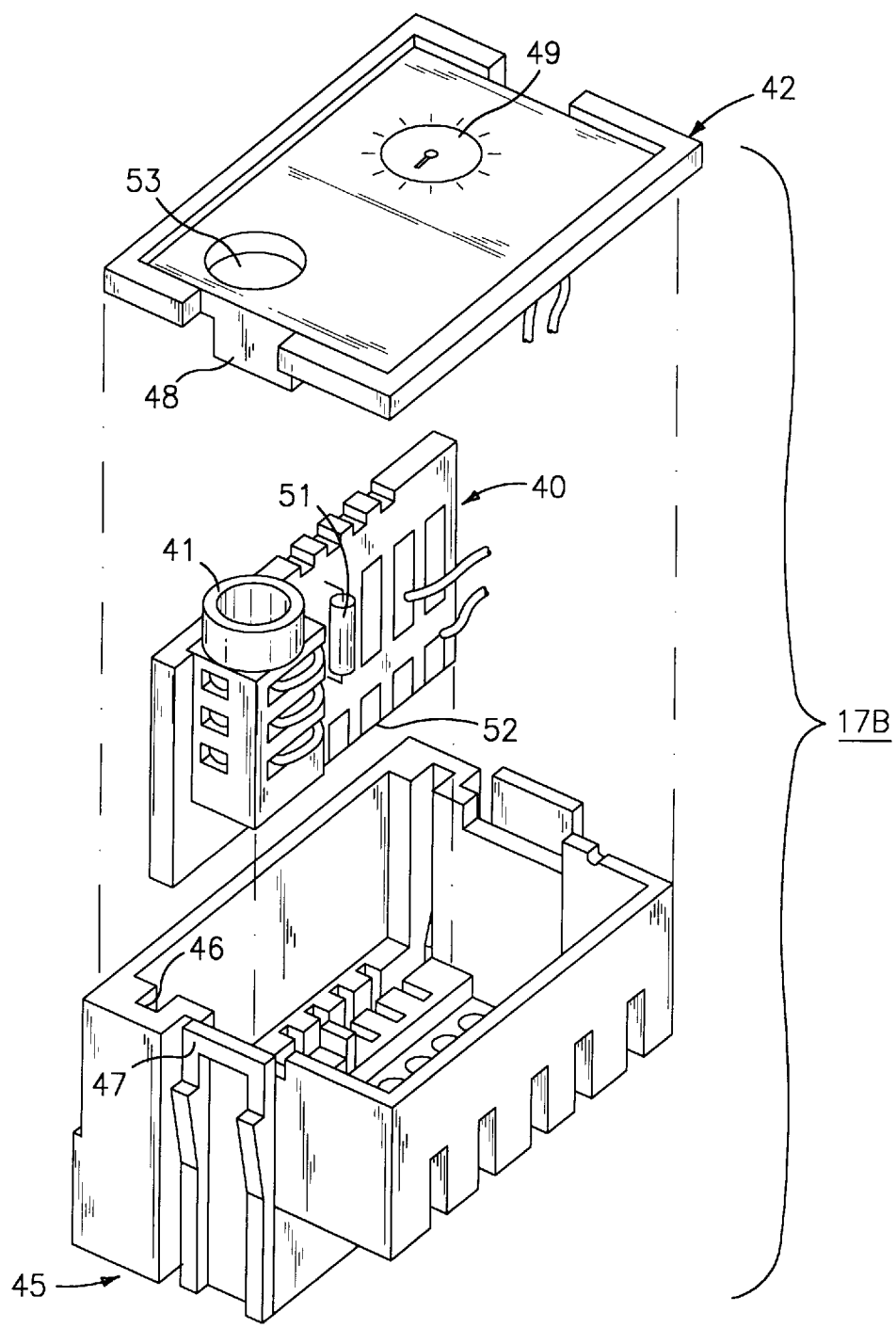
FIG. 3 is a top perspective view of the ground fault-rating plug according to the invention.

In accordance with the invention, the ground fault/rating plug 17B as shown in FIG. 3 is in the form of a cover 42 and case 45 that houses a printed circuit board 40 is provided with a rating plug resistor or "burden resistor" 51 along with the ground fault rotary switches 49. Rotary switches 49 may comprise a variable switch or a variable resistor for selecting the level of ground fault protection in ground fault/rating plug 17B of the present invention. The opening 53 within the cover 42 allows access to the jack 41 to test the operability of the circuit breaker as well as to calibrate the trip unit components. The printed circuit board 40 is received within the slots 46 formed within the opposing walls of the case 45 and the upstanding side rails 47 are received within the slots 48 on the opposing edges of the cover in press-fit relation. The burden resistor 51 connects with the trip unit 9 of FIG. 1 by means of connector 52 located on the edge of the printed circuit board. The rotary switches 49 connect with the trip unit 9 of FIG. 1 by means of connector 52 located on the edge of the printed circuit board. Insertion of the connector 52 into the mating trip unit connector provides the electrical connection between the jack 41, burden resistor 51 and the rotary switches 49 with the trip unit circuit components and configures the trip unit circuit for ground fault protection.

To enable the electronic trip un it for overcurrent operation per se, the rating plug 17A containing the burden resistor alone (FIG. 1 ) is inserted within the rating plug receptacle 17. Rating plug resistor/burden resistor 51 within the enclosure has a first resistance value for configuring the circuit breaker trip unit to provide a circuit breaker ampere rating for providing overcurrent protection. To enable the electronic trip unit for ground fault protection as well as overcurrent protection, the ground fault/rating plug 17B is inserted within the rating plug receptacle. The ground fault variable switch within the enclosure is electrically connected to the circuit breaker trip unit and configures the circuit breaker trip unit to provide ground fault protection. Since the firmware containing the ground fault algorithms of operation is already included within the electronic trip unit ROM 37

(FIG. 2) the connection of the settings provided by the rotary switches 49 automatically configures the trip unit circuit for the ground fault protection function. A jumper located in the ground fault/rating plug enables the ground fault function in the trip unit and informs the trip unit to use the rotary switch configuration to configure the ground fault function. This allows the ground fault function to be configured in the field at a later time rather than at the time of manufacturing. In many applications, the ground fault configuration depends on the breaker rating. By combining the normal rating plug function with the ground fault functions in one module, the ground fault information and the breaker rating information can be easily coordinated by a single plug.

What is claimed is:

1. A rating plug having ground fault and overcurrent protection facility for electronic trip circuit breakers comprising:

a case and a cover defining an enclosure;

a rating plug resistor within said enclosure, said rating plug resistor having a resistance value for providing a circuit breaker ampere rating to provide overcurrent protection;

a ground fault switch within said enclosure, said ground fault switch providing a signal for configuring a microprocessor of a circuit breaker trip unit to provide ground fault protection.

2. The ground fault-rating plug of claim 1 including a printed circuit board within said enclosure, said rating plug resistor being arranged on said printed circuit board.

3. The ground fault-rating plug of claim 1 wherein said ground fault switch comprises a variable switch.

4. The ground fault-rating plug of claim 3 wherein said variable switch comprises a variable resistance potentiometer.

5. The ground fault-rating plug of claim 3 wherein a part of said variable switch extends outside said enclosure for manual access thereto.

6. The ground fault-rating plug of claim 2 including means at one end of said printed circuit board for electrical connection with a circuit breaker trip unit circuit.

7. A circuit interrupter having ground fault and overcurrent facility comprising:

a circuit breaker cover attached to a circuit breaker case;

an electronic trip unit within said cover, said electronic trip unit being capable of overcurrent and ground fault circuit interruption;

a rating plug receptacle on said cover, over said trip unit whereby insertion of a rating plug containing a rating plug resistor within said receptacle configures said trip unit for overcurrent protection, and insertion of a ground fault-rating plug containing a ground fault switch along with said rating plug resistor configures said trip unit for both overcurrent and ground fault protection by providing a signal to a microprocessor of said circuit breaker trip unit, said signal being representative of a ground fault trip level.

8. The circuit interrupter of claim 7 wherein said ground fault-rating plug comprises:

a rating plug case and a rating plug cover defining an enclosure;

said rating plug resistor being within said enclosure, said rating plug resistor having a first resistance value for providing a circuit breaker ampere rating for providing overcurrent protection; said ground fault switch being within said enclosure, said ground fault switch providing a signal to a microprocessor of a circuit breaker trip unit for configuring said circuit breaker trip unit to provide ground fault protection.

9. The circuit interrupter of claim 8 including a printed circuit board within said enclosure, said rating plug resistor being arranged on said printed circuit board.

10. The circuit interrupter of claim 8 wherein said ground fault switch comprises a variable switch.

11. The circuit interrupter of claim 10 wherein said variable switch comprises a variable resistance potentiometer.

12. The circuit interrupter of claim 10 wherein a part of said variable switch extends outside said enclosure for manual access thereto.

13. The circuit interrupter of claim 9 including means at one end of said printed circuit board for electrical connection with a circuit breaker trip unit.

14. The circuit interrupter of claim 9 wherein said printed circuit board extends between said rating plug cover and said rating plug case.

\* \* \* \* \*